United States Patent
Viaud et al.

(10) Patent No.: US 8,186,137 B2
(45) Date of Patent: May 29, 2012

(54) CROP BAFFLE ARRANGEMENT

(75) Inventors: Jean Viaud, Gray (FR); Emmanuel Chapon, Velet (FR); Sébastien Guillemot, Montseugny (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/543,217

(22) Filed: Aug. 18, 2009

(65) Prior Publication Data

US 2010/0043370 A1 Feb. 25, 2010

(30) Foreign Application Priority Data

Aug. 19, 2008 (DE) .......................... 10 2008 041 331

(51) Int. Cl.
*A01D 43/00* (2006.01)
(52) U.S. Cl. ........................................................ 56/190
(58) Field of Classification Search ................... 56/14.4, 56/16.1, 190, 219, 220, 341, 364
See application file for complete search history.

(56) References Cited

U.S. PATENT DOCUMENTS

| | | | |
|---|---|---|---|
| 6,688,092 B2 * | 2/2004 | Anstey et al. ................... | 56/220 |
| 6,962,041 B1 * | 11/2005 | Taylor et al. .................... | 56/364 |
| 7,107,748 B2 * | 9/2006 | McClure ........................ | 56/190 |
| 2003/0131575 A1 * | 7/2003 | Anstey et al. ............... | 56/16.4 R |
| 2003/0182921 A1 * | 10/2003 | McClure ........................ | 56/341 |
| 2006/0277888 A1 * | 12/2006 | Erdmann et al. ................ | 56/344 |
| 2007/0119140 A1 * | 5/2007 | Gette et al. ..................... | 56/364 |
| 2009/0100814 A1 * | 4/2009 | Egging et al. ....................... | 56/1 |

FOREIGN PATENT DOCUMENTS

| | | |
|---|---|---|
| EP | 1 252 813 | 10/2002 |
| EP | 1 413 190 | 4/2004 |
| EP | 1 621 068 | 2/2006 |
| EP | 1 790 206 | 5/2007 |
| EP | 1 038 431 | 9/2007 |
| EP | 1 932 419 | 6/2008 |

OTHER PUBLICATIONS

Eurasian Search Report, 4 Pages, Jan. 27, 2010.
European Search Report, 7 Pages, Feb. 10, 2010.

* cited by examiner

*Primary Examiner* — Thomas Will
*Assistant Examiner* — Mai Nguyen

(57) ABSTRACT

A baffle arrangement is provided for a harvested crop recovery machine such as a baler. The baffle arrangement has two baffles that follow each other in the direction of the flow of the crop. The upstream baffle is configured in the form of a rake and permits harvested crop lying upon it to fall back into the flow of the crop. A second baffle following the above baffle is configured as a deflector plate having a substantially closed surface and extends above an overshot conveyor in order to conduct harvested crop lifted by it with a minimal amount of friction and prevents the harvested crop from leaving the flow of crop.

9 Claims, 2 Drawing Sheets

CROP BAFFLE ARRANGEMENT

FIELD OF THE INVENTION

The invention concerns a baffle arrangement for installation on a crop recovery machine wherein two baffles follow each other in the flow of the crop where a downstream baffle is configured in the form of a deflector plate having a substantially closed surface, and a crop recovery arrangement.

BACKGROUND OF THE INVENTION

EP 1413190 discloses a round baler equipped with a pickup followed by an overshot conveyor and a cutter arrangement operating in an overshot manner. Above each of the pick-up and the overshot conveyor is provided a sheet metal guide, of which the one located downstream and above the overshot conveyor can deflect under the pressure of the harvested crop that is being conveyed. This configuration is detrimental in so far as crumbling harvested crop can accumulate on the two sheet metal guides and is blown downward during operation on public roads and this litters the streets. In addition it is difficult to configure the spatial arrangements optimally in the case of a vertical adjustment of the pick-up during the supply of harvested crop.

EP 1038431 discloses a round baler with two baffles that follow each other above a pick-up with an overshot conveyor and are configured with elastic tines that can conform to the thickness of the flow of the crop. The downstream baffle is controlled so as to pivot transverse to the flow of the crop and extends into the baling chamber and extends underneath a baling roll at the entrance to the baling chamber. This configuration is saddled with the disadvantage that in the case of a heavy flow of crop, the crop is forced through the spaces between the tines of the downstream baffle, resulting in an undesirable accumulation of crop.

SUMMARY OF THE INVENTION

The problem underlying the invention is seen in the fact that the supply of crop between the pick-up and the baling chamber can result in crop build up on its way over an overshot conveyor.

Crop is pressed against the downstream baffle of the overshot conveyor along its closed or generally closed surface, this avoids that the crop is forced out and coming to rest on the baffle. In addition the closed surface insures a low friction. The surface may nevertheless be profiled or the like, and must be substantially closed such that the crop cannot penetrate it. Moreover harvested crop that has penetrated openings in a baler, a chopper or the like and that has fallen onto the baffle can penetrate the openings of the upstream baffle and return again to the flow of the crop. The upstream baffle may be composed of flexible tines or rails, of rigid rods or the like and can be either fixed or adjustable.

If the two baffles overlap at least partially there is no gap between them and the crop is guided continuously. The upstream baffle can even extend beyond the downstream baffle and extend all the way into a baling chamber. Here there is a positive effect upon the flow of the crop if the upstream baffle is located on the side facing the flow of the crop. If necessary the downstream baffle can be closed or nearly closed and provided with recesses into which the tines or other projections of the upstream baffle can penetrate, so that the surface remains smooth even if the baffles are brought close to each other. Even if the baffles overlap at least partially, they can nevertheless maintain spacing between them in the unloaded condition, for example 40-50 mm. The degree of overlap or the length of the upstream baffle can also vary over the width of the flow of the crop.

If the downstream baffle is connected to the carrier of the upstream baffle, for example, by means of a bracket, by stops, supports, chains etc. the result is a movement that depends on the two parts that would avoid interruptions or steps in the flow of the crop in the case of a missing or low overlap. The carrier may be arms or the like arranged on either side that engage the center of the downstream baffle or at its front side and possibly form a tapering section that accepts the harvested crop.

An impact of the tines, stops or the like of the upstream baffle against the baling devices for example, a baling roll or baling belts can be avoided, if the downstream baffle simultaneously acts to limit its path. For example, the substantially closed surface deflector plate type baffle could be configured as a bracket or a roof and extend above the tines or the like—with or without spacing. The path permitted for the tines etc. could be adjustable or fixed.

A roll shaped baffle—that may or may not be driven—is located ahead of the upstream baffle; it reduces the friction of the harvested crop sliding along past it and thereby permits a higher take up velocity. The roll-shaped baffle may be configured in conventional manner and be either smooth or profiled.

The provision of bearings on the following baffle has the advantage that it can be immobilized and constantly retained in the optimal position. The bearings may be configured as bearing bores or bearing bolts, or in some other comparable manner.

The downstream baffle, configured with a substantially closed surface, is supported flexibly; this has the effect that it returns to its original position automatically after being deflected by a heavy flow of harvested crop. In this case a repositioning means or coupling using bearings or steering arms is not necessary. The flexibility can be brought about by a sheet metal plate or a plastic component. A resilient support can be configured by clamping between springs or by a single spring.

The guidance of the harvested crop along the surface(s) of the baffle can be improved if it follows the overshot conveyor located below it. Accordingly, a straight or a curved configuration permits it to comply with various types of overshot conveyors, for example, rotors, conveyor belts, tines on crankshafts, etc. If necessary, the curve can be also repositioned.

Although the invention can be applied to various agricultural machines, for example, all types of balers, pick-ups of forage harvesters, self loading forage boxes etc., it's best effects are applied to round balers of all configurations because there the crop is conducted directly from the pick-up to the baling chamber. The baffle arrangement represents a unit complete in itself that can be applied to existing crop take up arrangements.

Although the combination is effective at various points of surface type or cut or interrupted baffle; in the case of an overshot conveyor in the state of the art there is the danger that the crop is forced between the tines that could have been avoided with a surface type baffle.

When the carrier of the baffle arrangement or the downstream area of the surface type downstream baffle is attached and adapted to be pivoted vertically to a harvested crop take-up device or a frame of the crop recovery arrangement, then when the crop take up arrangement is raised the position of the baffles conforms to the conveying surface of the crop take up arrangement, so that the flow of the crop is improved. Here a multitude of coupling possibilities are provided, where in particular the pivoting connection of the closed surface type baffle to the frame assures an expanding supply cross section that is preserved before the entry into the baling chamber.

BRIEF DESCRIPTION OF THE DRAWINGS

A detailed description of the preferred embodiments of the invention is set forth below with reference to the accompanying drawings wherein.

DESCRIPTION OF THE PREFERRED EMBODIMENT

Figure 1:
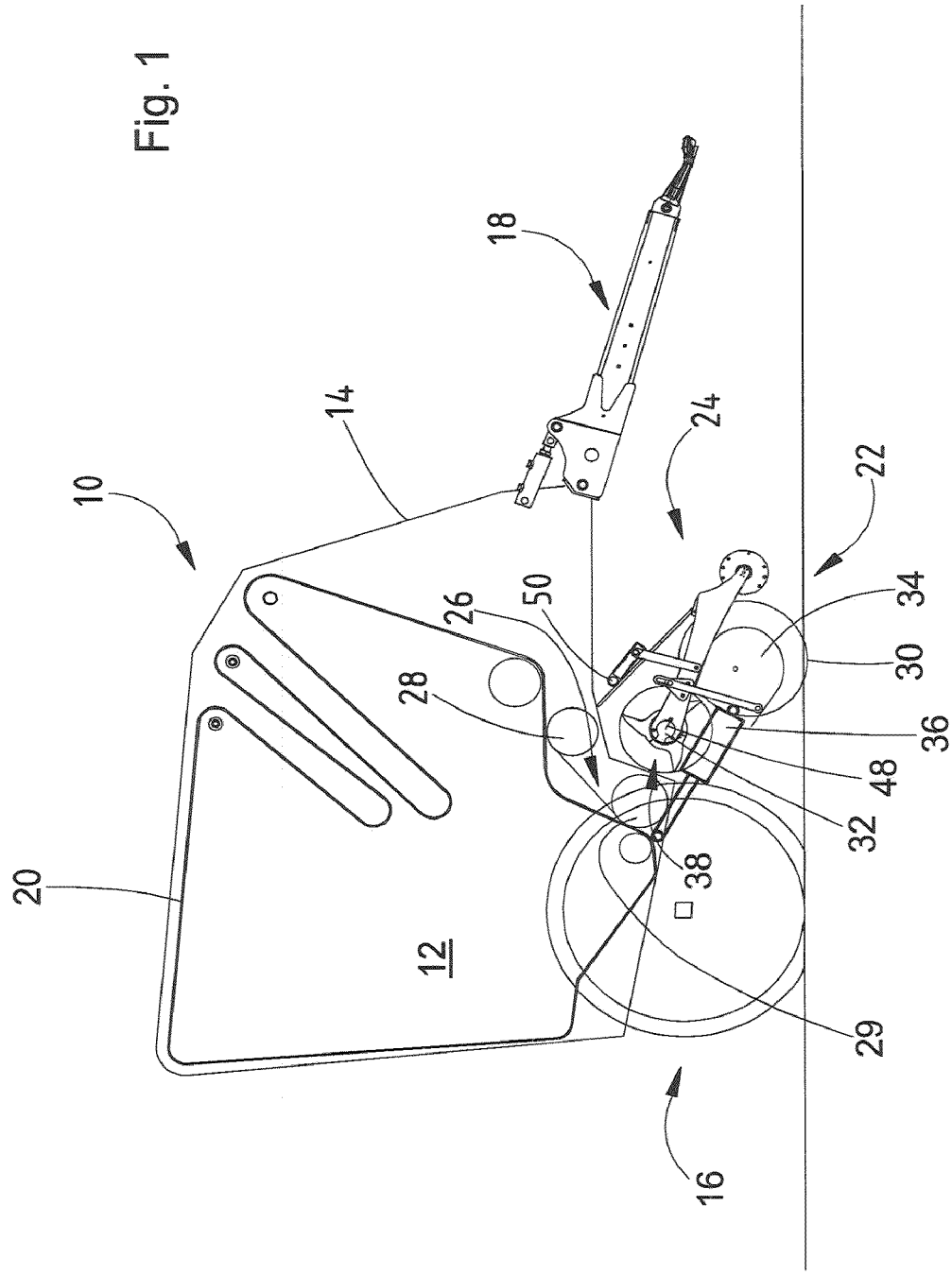
FIG. 1 is a side view of a crop recovery machine with a baffle arrangement according to the invention; and, FIG. 2 is a perspective view of the baffle arrangement of FIG. 1.

A harvested crop recovery machine 10 is configured in the form of a round baler with a variable baling chamber 12, a frame 14, a chassis 16, a tow bar 18, baling elements 20, a crop take-up arrangement 22, and a baffle arrangement 24.

The crop recovery machine 10 is generally configured in a conventional manner and takes up harvested crop lying in swaths on the ground in order to bale it. The density and the height of the swath varies more or less over its length, and varies also with the contour of the ground.

The baling chamber 12 is formed in the interior of the crop recovery machine 10 and is provided with an inlet 26 at the lower end of its front.

The frame 14 is composed of several welded or bolted components that are supported on the chassis 16 and can be connected by means of the tow bar 18 to an agricultural tractor or the like for field operation. Bearings 48, 50 are arranged on the frame 14 and are spaced a distance from each other both in the horizontal and vertical directions.

In this embodiment the baling elements 20 are configured as belts, which define the circumference of the baling chamber 12 and are conducted over a roll 28 that forms the upper edge of the inlet 26 and for which another roll 29 with the same orientation is provided toward which the baling elements 20 extend in a straight line at the beginning of the baling process, in order later on to be deflected by the incoming harvested crop. Instead of belts or in addition thereto rolls could also be provided as baling elements 20.

The harvested crop take up device 22 is provided in its forward region with a circulating tine rotor 30 that picks up harvested crop lying on the ground and conveys it towards the rear to the inlet 26. The crop take-up device 22 is connected in joints to the frame 14, so as to pivot about a bearing 32 and follows the contour of the ground by the use of guide wheels (not shown), or non-contact sensors (not shown). Since the chassis 16 and the guide wheels are located at a spacing from each other in the direction of operation, the harvested crop take-up arrangement 22 will perform a movement relative to the frame 14 in the case of uneven ground. In addition, the harvested crop take-up arrangement 22 can be raised into a transport position by means of a positioning arrangement 36 wherein it no longer touches the ground. In its rear region the harvested crop take-up arrangement 22 is provided with an overshot conveyor 38 that is described for example, by EP 0803184 B1. This overshot conveyor 38 is located at a distance from the inlet 26 on the one hand and the tine rotor 30 on the other hand, so that a safe conveying of the harvested crop from the ground to the inlet 26 is assured.

The harvested crop recovery machine 10 described so far corresponds to known configurations.

Figure 2:
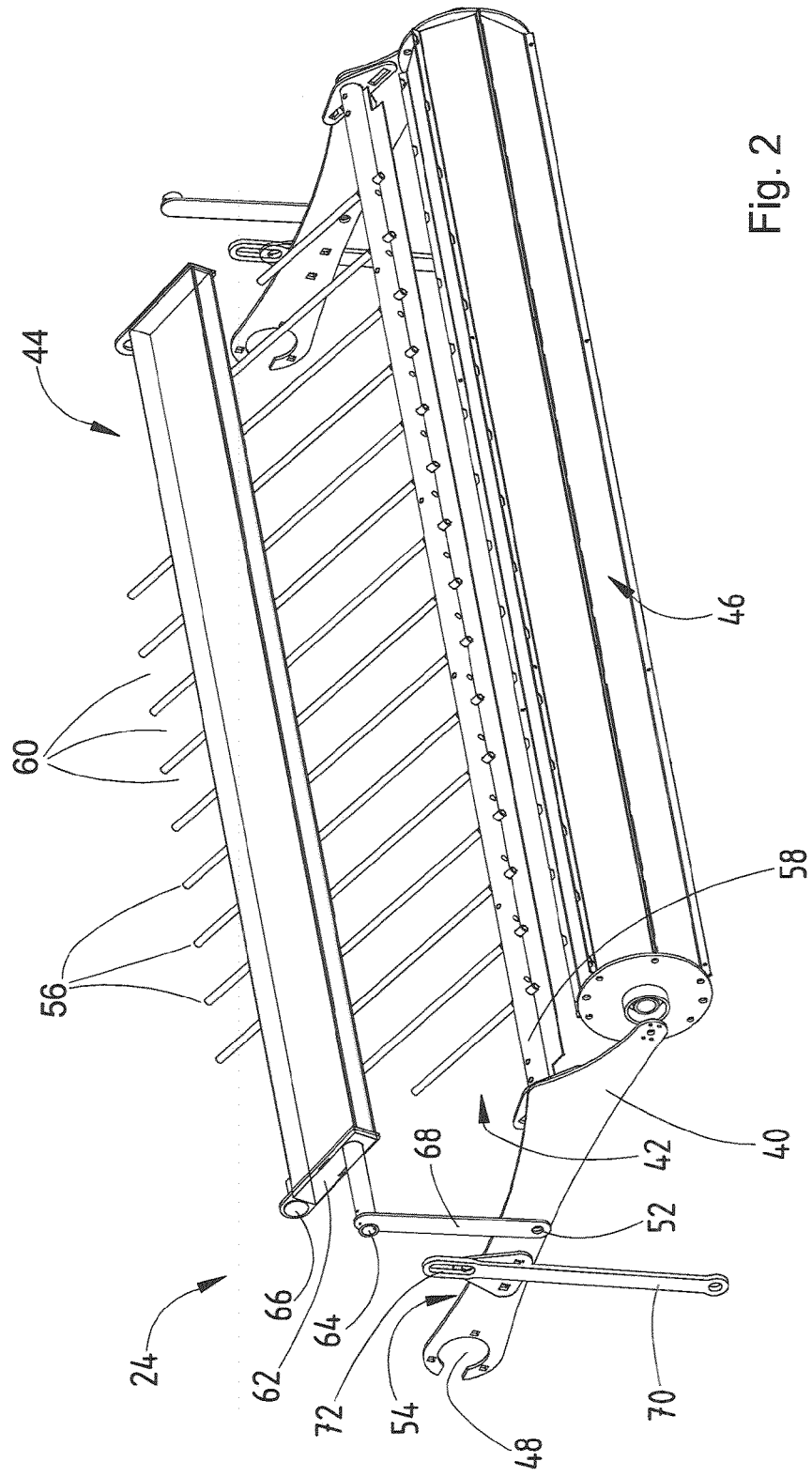

The baffle arrangement 24 is shown more clearly in FIG. 2 and will be described on the basis of this figure. The baffle arrangement 24 in each case includes carriers 40 configured as arms, an upstream baffle 42, a downstream baffle 44, and in this case it is preceded by a roll shaped baffle 46. The baffle arrangement 24 is a self-contained unit, that can be selectively applied to the harvested crop take-up arrangement 22. The width of the baffles 42, 44, 46, the tine rotor 30, and the overshot conveyor 38 is generally equal.

The carriers 40 are configured as stable steel sheet metal strips that extend generally on edge and horizontally from the bearing 48 up to the roll shaped baffle 46 and thereby generally span the length of the harvested crop take-up arrangement 22. A bearing 52, is located in each case, in the center and a further bearing 54 is located between this bearing 52 and the bearing 48. The bearings 52 and 54 in their simplest form consist of rods, screws, bolts or the like. All told, a carrier 40 is provided on each side of the harvested crop take-up arrangement 22 that extends parallel to the other carrier 40.

The upstream baffle 42 is configured in the form of a rake with a multitude of tines 56 that extend radially from a tine carrier 58. In this embodiment the outer tines 56 extend almost to the downstream baffle 44, while the inner tines extend beyond this and thereby are also aligned with it in sections. The tines 56 are configured as straight parts but could also be configured as swinging, bent sharply or formed in some other way and are flexible. The tine carrier 58 extends between the two arms 40 and is secured at its ends to these by screws or by welding; if required, it can be adjusted relative to the arms 40. In the embodiment shown, the principal plane of the tines 56 extends at an angle of 10 to 15 degrees from the longitudinal center line of the arms 40. The tine carrier 58 is spaced at only a small distance to the circumferential surface of the roll shaped baffle 46, in order to avoid jams in the flow of the harvested crop. The tines 56 leave openings or spaces 60 between them that are sufficiently large to permit remaining harvested crop located on top of them to pass through them. Such passage can be supported if necessary by vibration of the tines 56.

The downstream baffle 44 is configured generally as a deflector plate having a fully closed surfaces or substantially closed surfaces, for example, as a sheet metal part, a plastic plate, or the like. Nevertheless, small interruptions may exist in the surface as long as they do not offer the harvested crop any possibility of penetrating through it or as long as they do not offer any resistance to the harvested crop sliding along its surface or even damage it. In order to be protected against the force of the harvested crop being pressed against it, the baffle 44 is provided either with reinforcing ribs or edges, or is configured as a double walled component or the like. The baffle 44 extends over a length of 0.2 to 0.4 meters between the roll shaped baffle 46 and the inlet 26 above the upstream baffle 42 and extends over its entire width. A space of 40 to 60 mm normally may exist—but need not be so—between the upper side of the upstream baffle 42 and the underside of the downstream baffle 44. A forward bearing 64 and a rear bearing 66 is provided on both side cheeks 62 of the surface-type downstream baffle 44, where the forward bearing 64 is configured as a journal and the rear bearing 66 is configured as a bore. A steering arm 68 that is in the form of a stiff steel sheet metal plate, connected in joints, extends between the forward bearing 64 and the bearing 52 on the particular arm 40. The rear bearing 66 may be connected by means of a screw or the like to the bearing 50 at the frame 14.

The roll shaped baffle 46 is configured as a profiled or smooth roll that can be rotated freely and is supported in bearings in the forward end regions of the arms 40.

The bearing 54 is used for a connection in joints with an end region of a strap 70, that is connected at its other end with side cheeks 34 of the harvested crop take-up arrangement 22 and is connected, free to pivot to the bearing 54 in its end region—in this case its upper end region—with a slot 72. The use of the slot 72 permits a limited upward movement, so that the baffle arrangement 24 can conform to varying thicknesses of swaths. On the other hand this arrangement permits the maintenance of a minimum spacing at all times between the harvested crop take-up arrangement 22 and the overshot conveyor 38. FIG. 2 also shows that a broad strip between the roll type baffle 46 and the downstream baffle 44 is covered only by the tines 54, so that large spaces exist between these, through which crumbling harvested crop can fall back into the flow of the crop. On the other hand the downstream baffle 44 is always located within the frame of movement limited by the slot 72 above the overshot conveyor 38 and provides the assurance with its closed or nearly closed surface that the harvested crop is conducted safely and quickly to the inlet 26.

On the basis of the forgoing description the following functions will result.

In order to take up harvested crop from the ground, the harvested crop take-up arrangement 22 of the harvested crop recovery machine 10 is lowered to the ground on the field and moved along a swath so that the tine rotor 30 can raise the harvested crop and convey it by means of the overshot conveyor 38 to the inlet 26. In this way the flow of harvested crop taken up is boarded on its upper side by the baffles 42, 44 and if available also by the roll shaped baffle 46. It will be seen particularly in FIG. 2, that raising the baffle arrangement 24 will lead to a pivoting movement of the arms 40 upward about the bearing 48 as a result of the density of the swath. This pivoting movement is transmitted by means of the steering arms 68 over the forward bearing 64 to the front side of the baffle 44 which will also pivot upward about the bearing 66. Since the upstream baffle 42 is connected there with the arms 40, it moves with these, however without changing its relative position against them. Depending on the height of the swath the tines 56 are deflected upward and move towards the underside of the downstream baffle 44; in the worst case they collide with the latter, so that it operates as a path limiter.

Having described the preferred embodiment, it will become apparent that various modifications can be made without departing from the scope of the invention as defined in the accompanying claims.

The invention claimed is:

1. A baffle arrangement for a harvested crop recovery machine having an overshot crop conveyor, the baffle arrangement having an upstream baffle and a downstream baffle following each other in the direction of the flow of harvested crop, the downstream baffle being configured as a deflector plate having a substantially closed surface, wherein the upstream baffle is provided with openings; wherein the downstream baffle is connected with a carrier of the upstream baffle; and wherein the downstream baffle extends above the overshot conveyor such that crop is pressed against the downstream baffle along its substantially closed surface to avoid crop being forced out of and resting on the baffle arrangement.

2. A baffle arrangement according to claim 1, wherein the baffles partially overlap each other.

3. A baffle arrangement according to claim 1, wherein the downstream baffle operates as a path limiter for the upstream baffle.

4. A baffle arrangement according to claim 1, wherein a roll shaped baffle is located ahead of the upstream baffle.

5. A baffle arrangement according to claim 1, wherein the downstream baffle is provided with a bearing at its downstream end region.

6. A baffle arrangement according to claim 1, wherein the downstream baffle is one of resilient or resiliently supported in bearings.

7. A baffle arrangement according to one claim 1, wherein the downstream baffle is one of a straight or bent element.

8. A harvested crop recovery machine with a baffle arrangement and an overshot crop conveyor, the baffle arrangement having an upstream baffle and a downstream baffle following each other in the direction of the flow of harvested crop, the downstream baffle being configured as a deflector plate having a substantially closed surface, wherein the upstream baffle is provided with openings; wherein the downstream baffle is connected with a carrier of the upstream baffle; and wherein the downstream baffle extends above the overshot conveyor such that crop is pressed against the downstream baffle along its substantially closed surface to avoid crop being forced out of and resting on the baffle arrangement.

9. A harvested crop recovery machine according to claim 8, wherein the carrier of the upstream baffle is configured with plane surfaces and is attached so as to pivot vertically to one of a harvested crop take up device or a frame.

\* \* \* \* \*